United States Patent Office 3,108,417
Patented Oct. 29, 1963

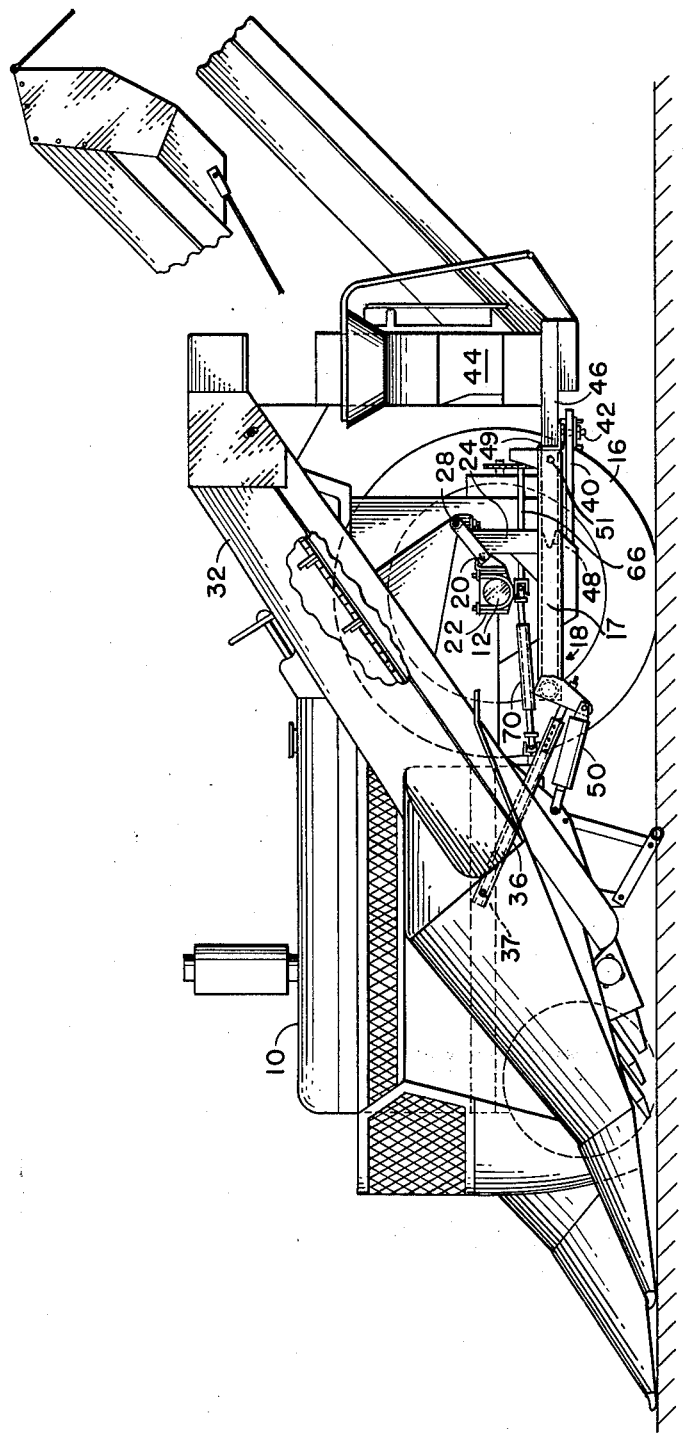

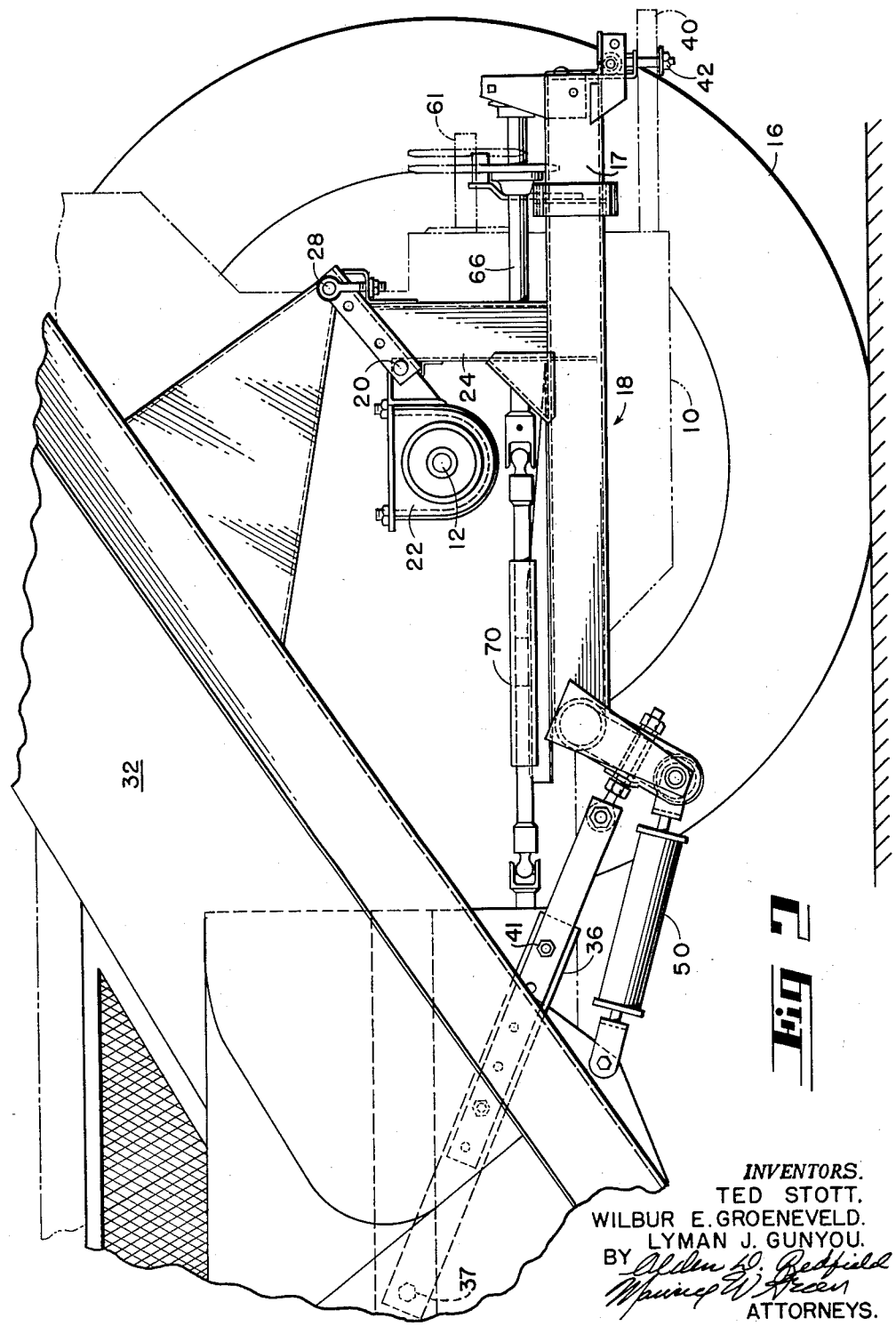

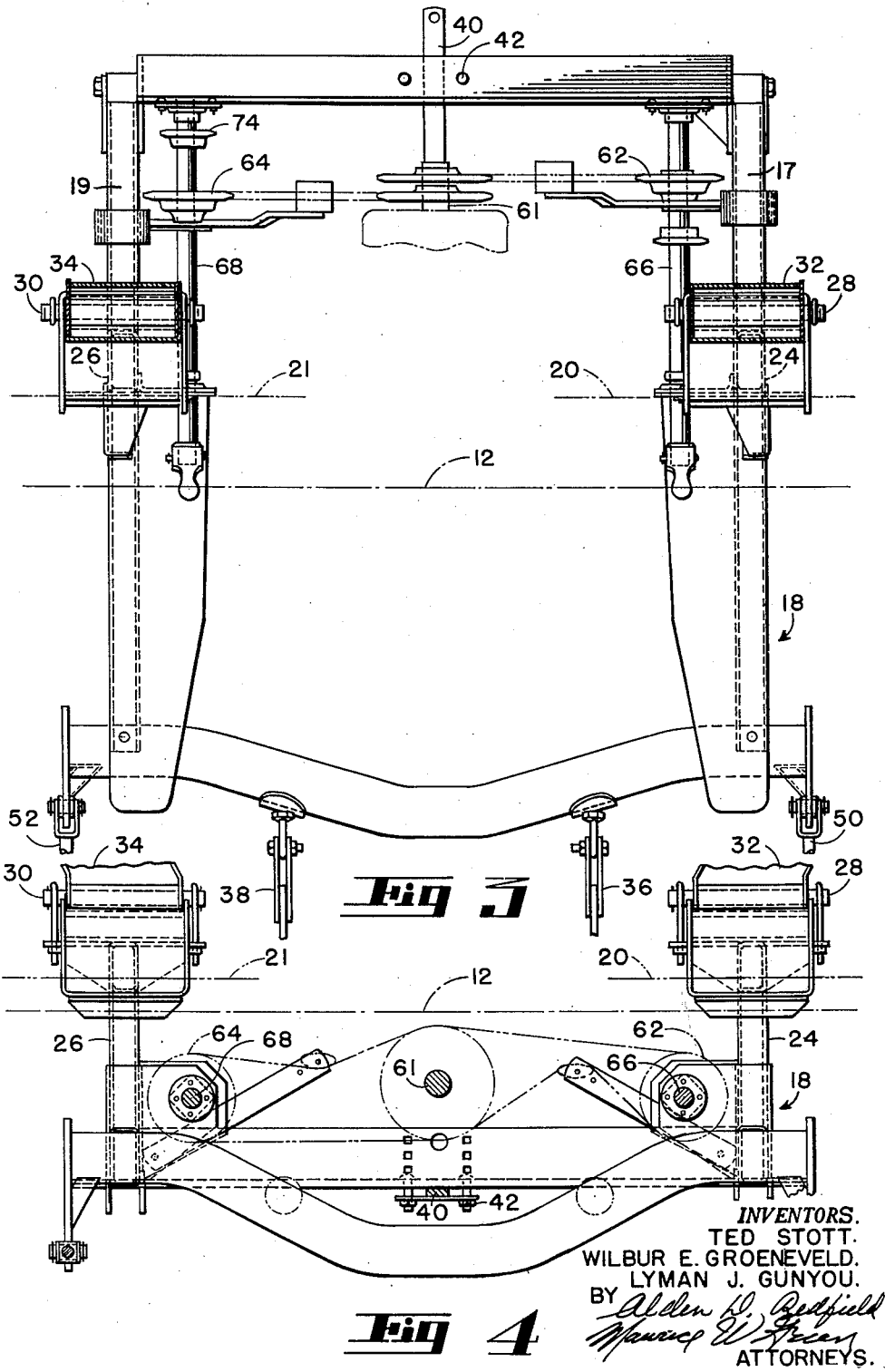

3,108,417
UNIVERSAL TRACTOR MOUNTING AND DRIVE
MEANS FOR A CORN HARVESTER
Ted Stott, Wilbur E. Groeneveld, and Lyman J. Gunyou,
Celina, Ohio, assignors to Avco Corporation, Cold-
water, Ohio, a corporation of Delaware
Filed June 21, 1961, Ser. No. 118,715
13 Claims. (Cl. 56—15)

This invention relates to a tractor mounted corn harvester and more particularly to universal mounting and power drive means therefor, adapting the corn harvester for mounting and operation on many models of tractors.

It has been common practice in mounting certain types of corn harvesting equipment on farm tractors to provide gathering units with snapping roll mechanism in such manner as to be carried and driven at the side of a tractor in order to snap and husk the corn from the corn stalks of a row, or rows, along which the tractor is driven. The width of a modern tractor is such that two of these gathering units can be carried, one on each side of the tractor, and the tractor driven with its front wheel centrally between two rows and with the tractor rear wheels sufficiently wide apart so that the rear wheels span two rows. The two gathering units are carried at the sides of the tractor inside the rear wheels and thus carried spaced apart sufficiently to gather corn from both rows, one row being on each side of the tractor. It is therefore necessary to support and provide power to operate these gathering units in an inclined position extending rearwardly from a point near the front of the tractor upwardly inclined to the rear and inward from each wheel.

Another unit of the corn harvester is required to receive snapped ears of corn severed (still unhusked) from the two rows of stalks by the gathering units above mentioned. Modern practice in this regard provides a unit for husking the ears by means of a so-called husking bed attachment or a different and relatively more modern unit for both husking and shelling. In any event, the unit which is to receive the ears from the gathering and snapping unit with the husks on, for either husking or husking and shelling, is mounted at the rear of the tractor.

The provision of mounting and driving means whereby these units, above mentioned, are mounted on and driven by the tractor, has been in most cases a tailored arrangement sometimes adapted to mount the harvester on only one make or model of tractor. While some prior devices have been provided with so-called "kits" or "bundles" of special adapting parts to enable a harvester of this type to be mounted on more than one tractor, these special parts have been relatively complicated and expensive and requiring much time to assemble.

In view of the fact that corn harvesters are implements having a shorter period of use during the year than the tractor, the farmer often desires, or by necessity, sells and replaces a tractor at a different time than a corn harvester. It has been a major loss in some cases that the corn harvester could not be adapted to a subsequently purchased tractor and had to be sold long prior to its maximum period of use.

A corn harvester of the mounted type, although it is mounted upon and driven by a tractor, is required to be transported over the ground with a definite relationship of the mechanism to the ground line. This is true since the gathering unit which initially contacts the ears of corn for snapping them from the rows of corn stalks in the field is necessarily definitely related to the ground line. Also, since the gathering unit must bear a definite relation to the ear processing unit into which the snapped ears are subsequently deposited for further processing, such as husking or shelling, that unit also must be positioned a definite distance from the ground. The entire corn harvester unit, as such, is thus definitely required to be supported with definite relation to the ground line.

In order to support and drive a harvester from a tractor with a minimum of special mounting requirements, it would therefore be ideal if all makes and models of tractors had a common standard location and arrangement of the attaching points and power take-off to which a corn harvester was to be attached, so that the harvester with its requirement of positioning could be supported and driven without special consideration for variation in tractor drive and support mechanisms.

Since models and makes of tractors vary in dimensions and arrangement, it is a primary object of the mechanism herein disclosed to provide an adapting subframe which, when assembled to any tractor to be used for mounting this corn harvester, will provide identical power drive and support connections to the corn harvester. With this subframe in position all models of tractors to which it is adapted will thus be rendered standard, insofar as the support and power drive connections for the harvester unit are concerned.

An important object of a universal mounting is thus the provision of a rigid subframe structure adapted to attach to any of many different models of tractors with attachments so related as to maintain an adapting frame structure with a fixed relationship to said frame to the ground line as well as to the units of the corn harvester, such as the gathering unit and ear husking or processing unit.

It is a further object to use relatively uniform points of attachment of the subframe to the several tractors as follows: (1) the rear tractor axles with mounting space available under the axles between and inward of the wheels of the tractor, (2) mounting holes on each side of the tractor frame well forward of the axle, together with (3) further common mounting possibilities available in the centrally positioned drawbar extending in a longitudinal direction rearward of the axle. Such available common or similar attaching points, together with a central power take-off drive (PTO) led to the concept of the so-called universal subframe supported on common or similar attaching points, which by the use of a minimum number of special brackets could attach the subframe structure in such manner as to maintain the same relationship of the subframe to the ground line on a major number of the tractor models available. Such relationship was assured by the fact that the primary pivot support to the frame is relative to the tractor axle and such variations as are evident in a great number of models of tractors in this pivotal point relative to the ground is compensated for by variations in attaching brackets positioning the pivotal point relative to the specific axle.

It is a further concept and object that such universal subframe, thus positioned relative to the ground, can be provided with certain adapting power transmitting drive mechanism in the form of parallel drive shafts, one on each side of the subframe. These shafts are driven by suitable flexible and easily adapted drive, such as a chain or belt from the central PTO shaft, and both the drive connections and support of the corn harvester can thus be accomplished in such a universal subframe with such frame relatively simplified in assembly to various tractors.

It is another important object that such adapting subframe be easily assembled to the tractor by lifting such subframe from the ground to its pivot connections adjacent the axles, the subframe being further stabilized by easily attached and adjusted secondary brace members to the tractor frame and to the drawbar.

The above and other objects of the invention will appear more fully from the following more detailed description of an actual mechanism here used for illustration and by reference to the accompanying drawings forming a part hereof and wherein:

FIG. 1 is a side view partly in section of the assembled unit showing the subframe, the mounting and driving means therefor, and the means for connecting the gathering units and a husking unit to the subframe.

FIG. 2 is an enlarged side view of the subframe and the mounting and driving means therefor but with the rearward husking bed not assembled to the subframe.

FIG. 3 is a top view of the subframe.

FIG. 4 is an end view of the subframe shown in FIG. 3 with diagrammatic showing of the power take-off drive and connections to the rotatable power shafts of the subframe.

Referring to the drawings, and particularly FIG. 1, there is shown a farm tractor 10 with laterally extending drive wheel axles 12, one drive axle 12 being shown in FIG. 1. Each of the axles carries a ground drive wheel, one wheel 16 being shown in FIG. 1. A universal mounting and subframe 18 is supported under the axles 12 on a pair of pivot connections 20, 21 such pivot connections being secured to the adjacent axles 12 by suitable brackets 22 which serve to locate the pivots 20, 21 and the subframe 18 a definite distance from the ground. Compensation for difference in location of the axle relative to the ground, or fore and aft location, on various tractors being compensated for by variations in the design of the brackets 22. The subframe 18 has upwardly extending pedestals 24, 26 secured to the subframe 18, one pedestal 24 being positioned inside the wheels on one side of the tractor and reproduced at pedestal 26 on the other side of the tractor (see FIG. 4). Such pedestals extend upwardly to the respective pivot connections 20, 21 and such connections afford a primary support from the axle housing to the subframe 18, the same pedestals 24, 26 are each also provided with pivot connections 28, 30 for the support of gathering and snapping units 32, 34. Gathering units 32, 34, in accordance with usual practice in the positioning of such units, are positioned inside the wheels on each side of the tractor (one wheel 16 being shown), extending forwardly and downwardly as shown in FIG. 1, it being understood that the gathering unit 32, shown in FIG. 2, is reproduced on the other side of the tractor and inside of the opposite wheel 16 as gathering unit 34, part of which is shown in FIGS. 3 and 4. As is disclosed in issued U.S. Patent 2,763,976, gathering units of this type employ so-called snapping rolls to sever corn from the stalks, the tractor with one gathering unit on each side thereof and inside the wheels are carried by the tractor down two spaced rows of corn, thereby to gather and snap ears from the two rows of corn thus contacted by the gathering units.

It is the further requirement that the subframe 18, primarily supported on the pivots 20, 21 located on the axle, is secondarily supported by a pair of diagonal braces 36, 38 (FIGS. 1, 2 and 3) extending forwardly from the frame 18 to mounting holes 37 one on each side of the tractor. These diagonal braces 36, 38 extend forwardly to the tractor frame and are mounted by suitable bolts at 37 to such frame, the braces 36, 38 being adjustable in length (shown by adjusting holes and bolts 41) to accommodate variations in the distance required for connection with varying tractors. The forward end of the subframe 18 is thus spacedly supported by the diagonal braces 36, 38 to the tractor frame. The rear of the subframe 18 is supported on drawbar 40 which is another substantially common point of reference on many models of tractors, the requirement for height of the drawbar from the ground being substantially uniform, in view of the fact that they are all designed for hitching to a conventional type of equipment. The connection from the drawbar to the subframe 18 is accomplished by bracket and bolt connection 42 substantially centrally of the rear of the subframe 18, minor variations in height of the drawbar are compensated in connection 42.

A husking bed, shown at 44 in FIG. 1, is assembled to the subframe 18 by two longitudinal forwardly projecting support members 46 with pointed ends 48. These pointed ends are insertable in the hollow rectangular receptacles afforded by the hollow rectangular side members 17, 19 of the subframe 18 and suitably secured in position by bolt connection 51, such connection being accomplished by like members on both sides of the subframe, the opposite hollow rectangular side member 19 being shown in FIGS. 3 and 4.

The gathering units 32, 34 are further supported, in addition to the pivot connections 28, 30, by hydraulic cylinder units 50, 52, or other suitable lifting mechanism, on each side of the frame, one acting as a support and adjustment member from subframe 18, side members 17, 19 to gathering units 32, 34, respectively, for each of the gathering units. It is thus possible by connecting the hydraulic system of the tractor to these hydraulic units 50, 52 to adjust the position of the gathering units 32, 34 by actuation of the hydraulic cylinders 50, 52, the two gathering units pivoting about the respective pivotal connections 28, 30.

The subframe 18, thus constructed and supported, is so connected by the brackets 22 to the axle housing, with secondary supports 36, 38 and 42 previously mentioned, as to position the subframe a definite distance from the ground. The subframe is also provided, as above described, for the support and adjustment of gathering units 32, 34 and for supporting the rear husking unit 44, or any other snapped ear corn processing unit. This support is provided by horizontal support members 46 which telescope into the frame as described.

The power take-off shaft 61 in the illustrative tractor here disclosed, although located generally in the position shown, may vary with different tractors in its vertical positioning as well as its fore and aft location. The adapting frame 18, being positioned as above described in definite relationship to the ground and in definite relationship vertically to the gathering units 32, 34, as well as the husking unit 44, is therefore provided with two parallel drive shafts 66, 68 supported on the subframe 18 in such position as to extend under the tractor axles longitudinally of the frame with suitable sprocket and chain drive 62, 64, or other flexible drive, to the centrally positioned power take-off shaft 61. The variations in the location of this power take-off shaft 61 can be compensated for by difference in the lengths of the chain 62, 64 and the positioning of the corresponding sprockets on the drive shafts 66, 68. Position of the drive shafts 66, 68 on the subframe, extending forwardly toward the gathering units 32, 34, makes it possible to connect drives to the gathering units 32, 34 through suitable universal joint and telescoping connections 70, as shown, to complete the rotating drive for the two gathering units. The drive to provide rotation of the husking unit mechanism 44 is completed by a chain connecting to a sprocket 74 from one of the spaced drive shafts, such as from shaft 68, thus providing drive to the husking unit mechanism 44 or other ear processing unit. It is noted that the shafts 66, 68 are properly located under the axles and between the subframe and the axle, thus making the subframe easily assembled under the axles. The adapting drive unit for furnishing of power to the gathering units and the husking unit is thus accomplished by the provision of shafts which are definitely located relative to the subframe and relative to the units to be driven, with compensating and adapting connections to provide for variation in the location of the power take-off shaft as above described.

By the structure herein disclosed there is afforded a rigid subframe structure 18 adapted for attachment to any of many different models of tractors, while maintaining a fixed relationship of said subframe 18 to the ground line. This positioning with variations for tractor dimensions is accomplished by variation in the brackets 22, surrounding the axles 15, 16 with these brackets affording a definite pivot position for the pivots 20, 21.

The subframe is thus primarily supported on these two pivots with definite ground line relationship. Two additional secondary connections for the subframe are provided by the forwardly extending diagonal braces 36, 38 which are connected to mounting holes on each side of the tractor frame. The fifth support point is, as previously mentioned, the bolt connection to the drawbar at 42 substantially centrally at the rear of the subframe 18. The upwardly extending pedestal 24, 26 to which the pivot connections 20, 21 are secured for primary support of the subframe also carry pivot connections 28, 30 for the primary central support of the gathering and snapping units 32, 34 as previously mentioned. Two lifting mechanisms, here disclosed as hydraulic units 50, 52, complete the support for the two gathering units 32, 34 and adjustment thereof relative to the ground line.

The processing unit, here disclosed as a husking unit 44, is supported from the subframe by suitable support brackets here shown as a telescoping connection 46 on each side of the subframe, and thus the processing unit is supported in proper relation to the gathering unit from which it receives the ear corn to be processed and, because of its location in positive relationship to the subframe, the adapting drive shafts 66, 68 also afford a positive and definite location of the drive connections from the subframe to both the processing unit and the gathering unit. It has previously been mentioned that the adapting drive shafts 66, 68 of the subframe are definitely positioned relative to the subframe and therefore relative to the units which they drive, namely, the gathering units 32, 34 and the processing units 44. The power take-off shaft of the tractor may vary in its position for different tractors and is compensated for by the drive chains, belts, or other flexible drives, 62, 64 and by the variation in the position of the sprockets on the drive shaft. The rotating axes of the shafts are, however, kept in a definite constant relationship to the subframe 18.

The subframe 18, as above described, is thus rendered an adapting unit which when in position on the tractor in effect compensates for variation in certain of the dimensions of the tractor being used and positions the connection for both drive and support to the gathering units 32, 34 and the ear processing or husking unit 44 in a uniform positive location as would be the case if there were no variation in the various tractors to which the subframe is adapted.

It is thus apparent that the adapting subframe 18, while providing for temporary separation of the gathering units and husking bed from the subframe while the subframe is left on the tractor, is a very satisfactory adapting intermediate unit for completing the assembly and the drive. Even the subframe itself can be very easily assembled or disassembled from the tractor, inasmuch as it can be lifted into position under the tractor axles and initially connected by suitable pins at the two pivot connections 20, 21 and subsequently connected more permanently to the tractor by the connection of the two secondary supporting members.

It is noted that other units besides the specific husking bed 44, here disclosed, may be attached at the rear of the frame by similar attaching means. Such units may be any type of processing unit, mounted in the same manner. It is also possible by the use of adapting connections to mount a trailing husking bed such as is shown in U.S. Patent 2,763,976 or a trailing shelling unit of similar dimensions.

Although the invention has been described by reference to a specific structure found practical in actual operation, it is intended that various variations may be made within the scope of the following claims.

We claim:

1. In a mechanism for mounting and driving a corn harvester on each of many tractors of varying dimensions; the corn harvester being of the type employing spaced gathering and ear snapping units extending upwardly and rearwardly over the tractor drive wheel axles and supported relative to the ground in position to snap ears of corn from rows of corn stalks and an ear receiving processing unit positioned rearward of said gathering ear snapping units; each of said tractors being of the type affording, in addition to said wheel axles, a forwardly extending frame, a power take-off shaft and a drawbar; the combination comprising: a subframe, bracket connecting means adjacent said wheel axles supporting said subframe under said tractor drive wheel axles in definite relation to the ground line with variation in said bracket connecting means to compensate for variation in position of said tractor axles relative to the ground line on various tractors, secondary connecting means from said subframe to said forwardly extending tractor frame and said drawbar for completing a rigid support of said subframe, uniform support connections carried on said subframe positioning and supporting said gathering ear snapping units and said ear receiving processing unit uniformly relative to said subframe, said subframe comprising the sole support for said units, drive shaft means mounted on said subframe, uniform drive connections from said drive shaft means to said gathering units and said ear processing unit, and flexible drive connections from said tractor power take-off shaft to said drive shaft means with variation therein to compensate for variation in position of said tractor power take-off shaft.

2. In a mechanism for mounting and driving a corn harvester on each of many tractors of varying dimensions; the corn harvester being of the type employing spaced gathering and ear snapping units extending upwardly and rearwardly over the tractor drive wheel axles and supported relative to the ground in position to snap ears of corn from rows of corn stalks and an ear receiving processing unit positioned rearward of said gathering ear snapping units; each of said tractors being of the type affording, in addition to said wheel axles, a frame, and a power take-off shaft; the combination comprising: a subframe, bracket connecting means adjacent said wheel axles supporting said subframe under said tractor drive wheel axles in definite relation to the ground line with variation in said bracket connecting means to compensate for variation in position of said tractor axles relative to the ground line on various tractors, secondary connecting means from said subframe to said tractor frame for further support of said subframe, uniform support connections carried on said subframe positioning and supporting said gathering ear snapping units and said ear receiving processing unit uniformly relative to said subframe, said subframe comprising the sole support for said units, drive shaft means mounted on said subframe, uniform drive connections from said drive shaft means to said gathering units and said ear processing unit, and flexible drive connections from said tractor power take-off shaft to said drive shaft means with variation therein to compensate for variation in position of said tractor power take-off shaft.

3. In a mechanism for mounting and driving a corn harvester on a tractor; the corn harvester being of the type employing spaced gathering and ear snapping units extending upwardly and rearwardly over the tractor drive wheel axles and supported relative to the ground in position to snap ears of corn from rows of corn stalks and an ear receiving processing unit positioned rearward of said gathering ear snapping units; said tractor being of the type affording, in addition to said wheel axles, a frame and a power take-off shaft; the combination: a subframe, bracket connecting means adjacent said wheel axles supporting said subframe under said tractor drive wheel axles in definite relation to the ground line, secondary connecting means from said subframe to said tractor frame for further support of said subframe, uniform support connections carried on said subframe positioning and supporting said gathering ear snapping units and said ear receiving processing unit uniformly relative to said subframe, said subframe comprising the sole support for said units drive shaft means mounted on said subframe below said axles, drive connections from said drive shaft means to said gathering units and said ear processing units, and flexible drive connections from said power take-off shaft to said drive shaft means.

4. An assembly for ready and removable attachment of forward gathering and rearward ear receiving units of a corn harvester to any one of a plurality of different tractors of the type having a forwardly extending frame, a power take-off shaft, a rear wheel axle unit and a rear drawbar, said assembly comprising a unitary subframe adapted for mounting underneath said axle unit, said subframe having spaced side frame members for rearward attachment of said rearward ear receiving unit and serving to support said last named unit solely from said subframe, means to attach said subframe to said axle unit to support said subframe under said axle unit at a predetermined distance above ground level, means to adjustably attach the forward end of said subframe rigidly to said tractor frame at position to maintain said predetermined distance, whereby said subframe is rigidly supported at said predetermined distance, pivot support means carried on said subframe for supporting said forward gathering unit, connecting lifting means interconnecting the forward end of said subframe with said forward gathering unit to pivot said forward gathering unit with respect to said pivot support thereby to pivot and support said forward gathering unit solely from said subframe, longitudinally extending drive shaft means on said subframe transversely spaced from and parallel to said tractor power take-off shaft, flexible drive means from said power take-off shaft to rotate said rotatable drive shaft means, and rotatable drive connections from said drive shaft means to drive said forward and rearward units, whereby said subframe may be readily assembled and supported at said predetermined distance above ground level on a plurality of different tractors of varying dimensions, thereby to afford uniform support and drive connections from said subframe to said harvester units when said harvester is assembled for use with any one of said plurality of said tractors.

5. The invention as claimed in claim 4 wherein said longitudinally extending drive shaft means on said subframe comprises two laterally spaced and parallel drive shafts, one on each side of said subframe to drive each side of said forward gathering unit.

6. The invention as defined in claim 4 wherein means are provided to adjustably attach the rear of said subframe to said tractor drawbar at position to maintain said predetermined distance.

7. The invention as defined in claim 6 wherein said means to attach said subframe to said axle, said means to adjustably attach the forward end of said subframe to said tractor, and said means to adjustably attach the rear of said subframe to said drawbar are the only interconnections between said subframe and said tractor other than said flexible drive means from said power take-off shaft to said subframe drive shaft means.

8. The invention as defined in claim 4 wherein said means to adjustably attach the forward end of said subframe to said tractor frame comprises two spaced, opposed, diagonal braces, each of said braces having a series of apertures therein adapted for adjustable interconnection with respective sides of said forwardly extending tractor frame, and said means to attach said subframe to said axle unit including spaced pivots comprising two upstanding spaced pedestals one attached to each of said side frame members with each pedestal carrying one pivot support for one side of said forward gathering unit of said corn harvester.

9. The invention as defined in claim 4 wherein said spaced side frame members for attachment of said rearward ear receiving unit are provided with longitudinally extending hollow portions with open ends extending rearwardly, and wherein said rearward ear receiving unit has forwardly extending support members positioned to telescope into the hollow portion of said side frame members for rearward attachment and support of said rearward ear receiving unit.

10. The invention as defined in claim 4 wherein said means to attach said subframe to said axle unit includes a pivotal connection with the pivot axis substantially parallel to said axle unit.

11. An assembly for ready and removable attachment of forward and rearward tractor operated units of a corn harvester to any one of a plurality of different tractors of the type having a forwardly extending frame, a power take-off shaft, and a rear wheel axle unit, said assembly comprising a unitary subframe adapted for mounting underneath said axle unit, said subframe having spaced side frame members for rearward attachment of said rearward unit, means to attach said subframe to said axle unit to support said subframe under said axle unit at a predetermined distance above ground level, secondary supports on the forward portion of said subframe for connection to said tractor frame, means on said subframe to support said forward and rearward units solely therefrom, drive shaft means on said subframe supported thereon for rotation, flexible drive means from said power take-off shaft to rotate said drive shaft means, and drive connections to said forward and rearward units from said rotatable drive shaft means on said subframe comprising the sole rotatable driving connection to said units.

12. An assembly for ready and removable attachment of forward and rearward tractor operated units to any one of a plurality of different tractors of the type having a forwardly extending frame, a power take-off shaft, and a rear wheel axle unit, said assembly comprising a unitary subframe adapted for mounting underneath said axle unit, said subframe having spaced side frame members for rearward attachment of said rearward unit, means to attach said subframe to said axle unit to support said subframe under said axle unit at a predetermined distance above ground level, secondary supports on the forward portion of said subframe for attachment to said tractor frame, and means on said subframe to support said forward and rearward units solely therefrom.

13. An assembly for ready and removable attachment of a tractor operated implement to any one of a plurality of different tractors of the type having a forwardly extending frame, a power take-off shaft, and a rear wheel axle unit, said assembly comprising: a unitary subframe adapted for mounting underneath said axle unit, means to attach said subframe to said axle unit to support said subframe under said axle unit at a predetermined distance above ground level, secondary supports on the forward portion of said subframe for connection to said tractor frame, connecting means on said subframe to support said implement solely therefrom, drive shaft means on said subframe supported thereon for rotation, flexible drive means from said power-take-off shaft to rotate said drive shaft means, and drive connections to said implement from said rotatable drive shaft means on said subframe comprising the sole rotatable driving connection to said implement.

References Cited in the file of this patent
UNITED STATES PATENTS

| | | |
|---|---|---|
| 2,554,198 | Kuhlman | May 22, 1951 |
| 2,909,883 | Pool | Oct. 27, 1959 |
| 2,958,993 | Slavens et al. | Nov. 8, 1960 |